United States Patent [19]

Macedo

[11] Patent Number: 5,173,463
[45] Date of Patent: Dec. 22, 1992

[54] KAOLIN CONTAINING FLUID CRACKING CATALYST

[75] Inventor: Jose C. D. Macedo, Rio de Janeiro, Brazil

[73] Assignee: Petroleo Brasileiro, S.A.-Petrobras, Rio de Janeiro, Brazil

[21] Appl. No.: 805,734

[22] Filed: Dec. 9, 1991

Related U.S. Application Data

[63] Continuation of Ser. No. 404,030, Sep. 6, 1989, Pat. No. 5,082,815.

[30] Foreign Application Priority Data

Sep. 6, 1988 [BR] Brazil .............................. PI.8804582
Sep. 16, 1988 [BR] Brazil .............................. PI.8804777
Sep. 27, 1988 [BR] Brazil .............................. PI.8804981

[51] Int. Cl.$^5$ .......................... B01J 21/16; B01J 29/06
[52] U.S. Cl. ........................................ 502/68; 502/63; 502/81; 502/83
[58] Field of Search ........................ 502/68, 81, 83, 63

[56] References Cited

U.S. PATENT DOCUMENTS 4,356,338 10/1982 Young .................................. 585/407
4,970,183 11/1990 Nakamoto et al. ................... 502/68

Primary Examiner—Carl F. Dees
Attorney, Agent, or Firm—Louis A. Morris

[57] ABSTRACT

To obtain an improved catalyst for fluid cracking purposes, kaolin or metakaolin is reacted with an acid of the group of phosphoric, sulphuric and acetic acids by mixing and heating to 25°–110° C., after which the slurry is washed. The thus obtained kaolin is then mixed with a crystalline aluminosilicate and, optionally, with a clay (e.g. kaolin), an active matrix and, as balance, a synthetic matrix, such as silican, silica-alumina or aluminan. The improved catalyst gives a better performance in terms of conversion and gasoline-yield.

10 Claims, No Drawings

KAOLIN CONTAINING FLUID CRACKING CATALYST

This is a continuation division of application Ser. No. 07/404,030 filed Sept. 6, 1989 now U.S. Pat. No. 5,082,815.

The invention relates to catalytic compositions containing a zeolitic compound and an acid treated kaolin clay for cracking purposes. It is known from prior art that clay, due to its reasonable price and availability constitutes a particularly suitable FCC component.

In the prior art several thermal and chemical treatments are described for kaolin clay to be added to catalyst compositions to obtain improved catalyst characteristics.

The dealuminization of kaolin to produce a suitable porous substance for adding to catalyst compositions was the subject of GB 2,118,063, in which was described the preparation of a binder obtained by treating metakaolin with hydrochloric or nitric acid or aluminum chloride, with such an acid reacting with up to 25 mole % of the structural alumina in the metakaolin.

GB 2,120,571 also describes the acid leaching of kaolin to be added to catalytic cracking compositions. The metakaolin is leached with hydrochloric acid and then spray dried; it may subsequently be ion exchanged. However, acid leaching with hydrochloric or nitric acid only leads to a reduction of the alumina content of the product.

It is believed that reaction with the now proposed acids in the now proposed manner will result in some precipitation of alumina salts, which contributes to an improved performance.

Several proposals for the treatment of kaolin with a mineral acid have been put forward by the prior art.

EP 0 240 136 relates to a catalytic composition comprising a zeolitic material, a matrix material, and kaolin washed with a mineral acid. The kaolin is physically mixed with a mineral acid such as phosphoric or sulphuric acid. The resulting composition is to be used as a nitrogen scavenger. No catalytic activity occurs.

U.S. Pat. No. 3,406,124 relates to the preparation of a composite catalyst comprising crystalline aluminosilicate, in which preparative process an alumina containing clay is leached and subsequently precipitated in situ by neutralization. Such a preparation renders the clay useful as a binder in catalytic compositions.

Although the processes described hereinbefore have resulted in the physical characteristics of the catalyst compositions being improved, in catalytic cracking there is need for improvement of their catalytic performance. Thus, one of the aims of this invention is to prepare aluminosilicate containing catalytic compositions of which the catalytic performance is modified by acid treated kaolin or metakaolin.

The invention relates to a catalyst composition for fluid cracking comprising a. 5 to 50% by weight of a crystalline aluminosilicate;
b. 5 to 80% by weight of an acid treated kaolin or metakaolin obtained by admixing with an acid of the group of phosphoric, sulphuric and acetic acid, with the resulting slurry being heated to 25°–110° C. for 1 to 100 hours under atmospheric or superatmospheric pressure, washed, and, optionally, dried
c. 0 to 65% by weight of a clay such as kaolin;
d. 0 to 50% of an active matrix;
e. the balance being made up of a synthetic matrix such as silica, silica-alumina, or alumina.

It should be noted that from U.S. Pat. No. 3,437,441 an acid treatment of kaolin with sulphuric, phosphoric or acetic acid is known. However, the acid treatment described in said patent specification is a violent exothermic reaction obtained by calcination at a high temperature over a prolonged period of time. In this way a dealumination of more than 80% w/w is obtained. However, such a kaolin, for which no application in a composition is given, is not very useful for catalytic purposes.

Our invention relates to a catalytic composition and its preparation as indicated above, with the use of the resulting catalyst in a fluid bed cracking process producing an increase in bottoms conversion and gasoline yield and a reduction of coke production.

It is believed that reaction with the now proposed acids in the now proposed manner will result in some precipitation of alumina salts, which contributes to an improved performance.

Our invention also relates to the catalytic fluid cracking of hydrocarbons in the presence of a catalytic composition as mentioned above.

According to the present invention kaolin clay or metakaolin clay is reacted with a phosphoric, sulphuric, or acetic acid to create a suitable porous structure having a large surface area and pore volume and a high Lewis Bronsted acidity.

Kaolin is a natural, earthy looking aggregate, chiefly comprised of hydrated aluminum silicates, more accurately defined as a clay chiefly comprised of minerals of the kaolinite group. Kaolinite is a stacked clay mineral which has a molar ratio of silica to alumina of 2:1. It has a very low cation exchange capacity and nearly zero pore volume and surface area.

Kaolinite is formed by the regular stacking of equal layers, each consisting of a tetrahedral $SiO_4$ sheet and an octahedral $Al_2(OH)_6$ sheet, also called a gibbsite sheet, bonded together by common oxygen atoms to form a single sheet, which results in a strongly polar structure. These structures are stacked and kept in a crystalline lattice by Van der Waals forces.

Metakaolin is the kaolin clay obtained after thermal treatment of the kaolin, which involves its being heated at a temperature in the range of about 600° to 900° C. for a period of from about 15 minutes to 8 hours, preferably from 15 minutes to 2 hours. By this thermal treatment, which may be conducted in the presence of air, the raw kaolin is converted into a reactive form characterized as metakaolin.

In the case of sulphuric acid being used as a dealuminizing agent the use of metakaolin leads to optimum catalysts on account of superior acid strength and a higher specific area. For phosphoric acid the use of kaolin leads to optimum catalysts as a result of improved crystallization. Also for acetic acid the use of metakaolin leads to optimum catalysts. Treatment with phosphoric or acetic acid are preferred.

The amount of kaolin or metakaolin to be added to the catalyst composition lies within the range of 5 to 80% by weight, preferably within the range of 10 to 50% by weight, more preferably within the range of 10 to 45% by weight. If kaolin is treated with phosphoric acid, the obtained leached kaolin may then be post-reacted with rare earth salts.

The preparation of the acid treated kaolin or metakaolin clays is as follows:

(a) reacting kaolin or kaolin treated at a temperature above 600° C. for at least 0.5 hours (thus forming metakaolin) with an acid solution, the ratio by weight of acid solution to kaolin being 1 to 12, more particularly 3 to 6, to obtain a clay suspension. Use is made of an acid solution of 6% or more. For a sulphuric acid solution use is made of a 8 to 98%, preferably a 10 to 45% acid solution. A 6 to 85%, preferably a 10 to 45% acid solution is used for phosphoric acid and a 10 to 100%, preferably a 20 to 60% solution is applied for acetic acid.

(b) heating the suspension resulting from (a) at temperature of 25° to 110° C., preferably of 80° to 105° C., with continuous stirring, over a period of from 1 to 100 hours, preferably from 1 to 70 hours, from 60 to 80 hours, and from 20 to 80 hours, respectively, for sulphuric acid, phosphoric acid, and acetic acid, respectively. The final pH is between 0,1 and 4; more particularly, between 0.5 to 3, 1 to 3, and 2 to 3.5, respectively, for sulphuric acid, phosphoric acid, and acetic acid, respectively.

(c) isolating the product resulting from (b) by filtering it and thoroughly washing it with water. The product may be resuspended and refiltered repeatedly if desired, the pH of the suspensions being adjusted to between 1.0 to 3.0, more particularly to between 2.0 and 3.0.

(d) optionally drying the product resulting from (c) in an oven at 105°-115° C. for 15-18 hours or in a flash-dryer at the same temperature.

In the catalytic composition are used 5 to 50%, preferably 15 to 30% by weight of a molecular sieve.

All the molecular sieves usually employed in preparing fluid cracking catalysts can be used as zeolitic crystalline aluminosilicates. Preferred are crystalline synthetic aluminosilicates in the 3 to 15 Å diameter range. Examples include A, X, Y, ZK-4, ZK-5, ZSM-5, ZSM-11, and ZSM-12 zeolites and ultrastable zeolites. More preferred still is the use of X and Y or ultrastable types. To ensure reasonable catalytic action the cations of these zeolites, usually prepared in the sodium form, are exchanged. This ion exchange is usually effected using rare earth ions, ammonia, or hydrogen-containing solutions. Ion exchanging usually takes place until the sodium content in the catalyst is no more than 4 wt%, preferably less than 1 wt%.

All known compounds normally employed in and suitable for adding to zeolitic crystalline aluminosilicates may be used for the synthetic matrix, e.g., silica, alumina, magnesia, zirconia, titania, boria, and mixtures thereof. The use of silica, silica-alumina, or alumina is preferred. Such compounds are used in the catalytic composition in amounts of 0 to 50%, preferably of 0 to 20% by weight.

In addition to the acid-reacted kaolin or metakaolin and crystalline aluminosilicate other components may be added to the synthetic matrix. Examples include clays, such as kaolin, halloysite, bentonite, montmorillonite, and intercalated clays. Aluminum hydrates or oxides also may be added to the catalyst composition. Such compounds belong to the class of active and inert matrices.

They are added to the catalytic compositions in amounts of 0 to 65%, preferably of 10 to 65% by weight. Most preferably, 10-45% of kaolin clay is added.

The order in which the various catalyst constituents are added is not critical. The components of the catalytic compositions can be combined with the synthetic matrix by various well-known procedures. Useful methods for preparing fluid cracking catalysts are described, e.g., in U.S. Pat. No. 3,939,058 and U.S. Pat. No. 3,867,308.

In U.S. Pat. No. 3,939,058 a silica-alumina gel containing the desired components is formed. The rapidly formed catalyst beads are subjected to ion exchange and are then milled and resuspended in water, the resulting suspension being spray dried in a spray dryer to form the fluid cracking catalyst.

In U.S. Pat. No. 3,867,308 a suspension of zeolite and a clay is added to a silica sol prepared for use as a synthetic matrix for a catalytic composition, and said suspension is spray dried to yield a fluid cracking catalyst. This binder turns into a gel during the spray drying.

For the preparation of a catalyst according to this invention the latter procedure is preferred, since the mixing of acid-reacted kaolin or metakaolin with a nongelled binder before the spray drying of the binder yields a catalytic composition of relatively high density. Thus, apparent densities of higher than 0.5 g/ml are easily achieved.

In one embodiment, the procedure for preparing catalytic compositions according to this invention may comprise the following steps:

a) preparing the starting suspension for the catalyst
  b) forming and drying the particles
  c) washing the raw catalyst
  d) drying the washed catalyst
  e) optionally, calcining the finished catalyst.

For example, in step (a) a binder is prepared by the silica or silica-alumina hydrosol method. In this case, step (a) starts with the preparation of, e.g., a silica or hydrosol by adding sodium silicate to a sulphuric acid solution, or, in the case of a silica-alumina hydrosol, by mixing a sodium silicate solution with an aluminum sulphate solution. The final hydrosol has a pH of about 3.0. It should be noted that the silica or silica-alumina will act as a binder for the different catalyst ingredients, so that dense and attrition resistant particles are formed. After the hydrosol has been prepared, the other ingredients of the catalytic composition are added to it one by one, either in the form of a powder or as an aqueous suspension. The order in which they are added is not critical.

To arrive at a final homogeneous catalyst it is likewise important that the average equivalent diameter of the particles of all ingredients be less than 5 microns.

Step (b), namely the forming and drying of the catalyst particles, is carried out in a spray dryer. Thus step (b) furnishes the raw catalyst to be worked up in step (c) in order to dispose of soluble salts and reduce the sodium content of the catalyst composition. Such is accomplished by washing it with water. Finally, optional step (d) consists of drying the catalyst in an oven, after which the composition is ready to be tested and/or used, any calcination being optional.

The attrition resistance of the catalyst composition thus prepared is fairly high, being measured as nearly 10 on the Davison Attrition Index.

In another embodiment catalysts are formed using the aluminum chlorhydrol process. The alumina sol binder may be prepared by reacting aluminum metal with an aqueous solution of hydrochloric acid to form aluminum trichloride according to the general reaction $2Al + 6HCl \rightarrow 2AlCl_3 + 3H_2$. The aluminum chloride formed is subsequently reacted with water to yield a mixture of aluminum hydroxide and aluminum chloride in a molar ratio within the range of 4.5 to 7.0. According to one method, the aluminum is reacted with the aqueous hydrochloric acid at a temperature of 79° to 145° C. for 6 to 24 hours. The aqueous hydrochloric acid preferably contains from 0.5 to 1.5 moles of HCl per liter of water and is used in an amount of preferably from 0.35 to 0.54 moles of HCl for each gram atom of alumina. The reaction yields an alumina sol which is readily miscible with additional water. In this procedure the other components of the catalyst composition may be added either in the form of a powder or as an aqueous suspension. Since aluminum chlorhydrol is more effective when its pH lies within the acid range, after the addition of the aluminum chlorhydrate an adjustment is made to keep the pH in the range of 2.0–6.5, if necessary with the aid of an acid solution. The resulting suspension is spray dried, causing it to gel. By the breakdown of the aluminum hydrate by means of heat alumina is formed which will act as a binder for the various catalyst constituents, thus bringing about the formation of dense and attrition resistant particles.

The feeds to be processed in the presence of the catalytic compositions disclosed and claimed here are hydrocarbon feeds conventionally employed in industrial plants, e.g., virgin oil distillates or gas oils of a 221°–600° boiling point range which may first have been subjected to hydrotreatment The present invention will be illustrated with reference to the examples given below. The kaolin used in the examples is AMAZON-88 supplied by Caulim Amazonia S.A. (CADAM).

Particles thereof have an average diameter of 0.23 um and all are less than 2.0 um in diameter. These particles are very thin hexagonally shaped plates of about 0.01–0.02 um.

For the examples in which a silica or silica-alumina sol is used, the sol prepared as described above is dried in a spray dryer that has a centrifugal sprayer provided with a disk out of which the feed is ejected as spherical droplets. These are slowly dried into hard and tough particles, and become the raw catalyst. From the dryer the outflow is passed to a cyclone where the desired particle size is recovered. The temperature of air entering the sprayer is 350°–450° C., on leaving it is 110°–150° C., with rotation being about 25,000 rpm. It is in step (b) that, due to the relatively high temperature of the incoming air—near 400° C. —the silica or silica-alumina sol becomes a gel. The average equivalent diameter of suitable catalyst particles is about 50–60 um. After washing with water the catalyst is dried in an oven at 110°–115 for 15–18 hours.

If an alumina hydrosol is used, a hydrosol is prepared as indicated and diluted with water. To this are then added the other components, the order of addition not being critical.

The texture of the material formed is tested by nitrogen adsorption analysis. Also, the catalysts were tested for activity and selectivity after deactivation at 750° C. using a microactivity test (MAT) in accordance with procedures set forth on page 8-7 of the records of the First South American Ketjen Catalysts Seminar held at Rio de Janeiro, Brazil, on Sept. 22-24, 1985.

In these tests use is made of a virgin oil distillate having a boiling range between 221°–600° C., which has first been subjected to hydrotreatment. Further, use is made of the conventional conversion conditions, i.e., a temperature between 30°–600° C., a pressure of 2-3 atmospheres, and an hourly space velocity in the cracking zone from 5 to 250, the final coke deposit on the catalyst particles being as high as 2%.

EXAMPLE I

A catalyst for fluid catalytic cracking purposes was prepared according to the following formula:
15% of a RENH$_4$Y zeolite
20% of kaolin dealuminized with sulphuric acid for 6 hours. To this end 600 g of a 25 wt.%-solution of sulphuric acid were added, with continuous stirring, to 200 g of kaolin at a temperature of 100°–103° C. and atmospheric pressure. The reactions are carried out in a rotary evaporator to keep the suspension uniform. The resulting product is filtered, washed with 2 liters of demineralized water to remove soluble salts, and dried in an oven at 110°–115° C. for 16 to 18 hours.
43% of kaolin
22% of silica as synthetic matrix, the silica being prepared by the hydrosol procedure as described hereinbefore.

The ingredients were added to the silica hydrosol. The catalyst was prepared as described hereinbefore by steps a to d. The physical and chemical analysis data of the catalysts prepared as indicated below are given in Table I under catalyst A. MAT test results are shown in Table II.

EXAMPLE II

A catalyst composition was prepared as in Example I except that the kaolin was reacted with a 25 wt. %-solution of acetic acid for 64 hours. Thus catalyst B was obtained, of which the test results are given in Tables I and II.

EXAMPLE III

A catalyst according to Example I was prepared, except that 100 g of kaolin were treated for 20 hours with 600 g of a phosphoric acid solution, the excess of H$_3$PO$_4$ being 160% by weight. The physical analysis and activity test results are listed under catalyst C in Tables I and II.

In the Examples IV to VIII the kaolin clay was first heat treated at 700° C. for 5 hours before being dealuminized with acid to obtain metakaolin. Test results are to be found in Tables I and II.

EXAMPLES IV AND V

Catalyst D was prepared as described in Example I, except that the metakaolin was subjected to a sulphuric acid leaching treatment for 30 hours. Catalyst E was prepared similarly, except that the leaching treatment for the metakaolin was 64 hours.

EXAMPLE VI

Catalyst F was prepared with metakaolin, as described in Example II.

EXAMPLE VII

For the preparation of catalyst G were used the ingredients as described in Example III, except that for the reaction of the meta- kaolin 230 g thereof were treated with 575 g of a 21.25 wt. %-solution of a phosphoric acid for 64 hours.

EXAMPLE VIII

In this example for the preparation of a catalyst the method as described in Example I was used, except that the metakaolin was sulphuric acid leached for 1 hour. The formula of catalyst H is as given below:
15% of RENH₄Y zeolite
40% of dealuminized metakaolin
23% of kaolin
22% of synthetic matrix consisting of $SiO_2$ prepared by the hydrosol process.

TABLE I

| | ANALYSIS | | | | | | | |
|---|---|---|---|---|---|---|---|---|
| | Kaolin | | | Metakaolin | | | | |
| Ingredients | A | B | C | D | E | F | G | H |
| $RE_2O^3$ (wt. %) | 1.7 | 1.9 | 1.9 | 1.8 | 1.7 | 1.7 | 1.7 | 1.7 |
| $Na_2O$ (wt. %) | 0.24 | 0.19 | 0.19 | 0.22 | 0.29 | 0.19 | 0.18 | 0.15 |
| Surface Area (m²/g) | 115 | 93 | 101 | 120 | 105 | 137 | 102 | 111 |
| App. density (ml/g) | 0.85 | 0.79 | 0.75 | 0.79 | 0.79 | 0.77 | 0.78 | 0.78 |
| Davison Attrition Index | 9 | 9 | 9 | — | 14 | 12 | 10 | 13 |
| Texture | | | | | | | | |
| 30–60 Å (%) | 41 | — | 49 | — | 45 | 39 | — | 41 |
| 61–90 Å (%) | 14 | — | 17 | — | 12 | 13 | — | 12 |
| 91–180 Å (%) | 14 | — | 12 | — | 15 | 17 | — | 14 |
| 81–900 Å (%) | 27 | — | 15 | — | 23 | 27 | — | 22 |
| 900 Å (%) | 4 | — | 7 | — | 5 | 4 | — | 10 |

TABLE II

| | PERFORMANCE | | | | | | | |
|---|---|---|---|---|---|---|---|---|
| | Kaolin | | | | Metakaolin | | | |
| | A | B | C | D | E | F | G | H |
| Conversion (%) | 67.5 | 67.4 | 64.2 | 66.9 | 65.2 | 65.6 | 68.3 | 66.1 |
| Selectivities: | | | | | | | | |
| Hydrogen (%) | 0.02 | 0.03 | 0.02 | 0.03 | 0.03 | 0.03 | 0.03 | 0.03 |
| LPG (%) | 17.2 | 17.0 | 15.7 | 16.3 | 14.5 | 16.3 | 15.4 | 16.3 |
| Gasoline (%) | 72.7 | 73.7 | 75.5 | 73.3 | 78.9 | 75.8 | 76.7 | 77.3 |
| Coke (%) | 2.27 | 2.27 | 1.9 | 2.25 | 2.03 | 2.15 | 1.6 | 1.91 |
| LCO/HCO | 2.34 | 2.86 | 2.3 | 2.54 | 2.40 | 3.15 | 2.5 | 2.22 |

All catalysts show an improved performance as a result of the kaolin's being acid treated. Selecting the appropriate acid and time treatment allows for the preparation of the optimum catalyst.

Test results for catalysts K through R are to be found in Tables III and IV.

EXAMPLE IX

For the preparation of catalyst K there were added to a silica-alumina sol in an aqueous suspension: RENH₄Y zeolite, 200 g of kaolin heated at 700° C. for 5 hours and reacted with 600 g of a 25 wt. %-solution of acetic acid for 30 hours, kaolin, and an active matrix consisting of alumina powder. The preparation then continued as described above. The thus obtained catalyst was of the following formula:
15% of RENH₄Y
10% of metakaolin reacted with acid
20% of $Al_2O_3$
33% of kaolin
22% of synthetic matrix (97% of $SiO_2$ and 3% of $Al_2O_3$)

EXAMPLE X

The preparation of catalyst L is described as in Example IX, except that kaolin (not heat treated) is reacted with a 25 wt. %-solution of sulphuric acid for 20 hours instead of metakaolin being reacted with acetic acid.

EXAMPLE XI

Catalyst M was prepared as follows:
To a sol of silica-alumina were added an aqueous suspension of RENH₄Y zeolite, kaolin, and kaolin leached with a 25 wt. %-solution of sulphuric acid for 40 hours, as described above. Further drying, washing, and drying was as described before.

EXAMPLES XII AND XIII

Catalytic compositions were prepared as described below:

2864 g of metakaolin prepared as described above were reacted with a 21.25 wt. %-solution of phosphoric acid at 96° C. for 70 hours and resuspended in 43 liters of a rare earth solution (4.% of $La_2O_3$, 0.7% % of $CeO_2$, 1.5% of $Nd_2O_3$, 0.5% of $Pr_6O_{11}$). The resulting suspension was stirred for 3 hours, after which the product was filtered and washed with about 10 liters of water. The obtained filter cake was then dried for 17 hours at 110° C.

The thus obtained leached metakaolin, kaolin, and RENH₄Y were added to a silica sol in the following amounts:
15% of RENH₄Y
40% of acid-reacted kaolin for catalyst N and 20% for catalyst P
23% of kaolin for catalyst N and 43% for catalyst P
22% of silica The formed suspension was homogenized and dried in a spray dryer.

The results of the analyses of the obtained catalysts are to be found in Tables III and IV under catalysts N and P.

EXAMPLE XIV

The catalytic composition Q of this example was obtained by: treating kaolin with phosphoric acid for 50 hours at an acid solution/kaolin ratio of 6, with the excess of $H_3PO_4$ being about 30% by weight, and adding the resulting leached kaolin, alumina, kaolin, and RENH₄Y zeolite to an aluminum chlorhydrol solution in the following amounts:
15% of RENH₄Y
10% of acid-reacted kaolin
35% of kaolin 20% of alumina
20% of alumina powder The suspension was dried in a spray dryer after being homogenized. Test results for the resulting catalysts are listed in the tables below.

EXAMPLE XV

To a suspension of metakaolin leached for 30 hours with a wt. %-solution of sulphuric acid were added RENH$_4$Y zeolite and a 50%-solution of aluminum chlorhydrol. The pH of the suspension was set to 4.5 with an acid solution, and the whole was then dried in a spray dryer. The catalytic composition was then calcined to form the end product.

The resulting catalyst R was prepared using the following amounts:
15% of RENH$_4$Y
63% of kaolin dealuminized with sulphuric acid
22% of synthetic matrix (100% of Al$_2$O$_3$)

TABLE III

| Ingredients | ANALYSIS | | | | | | |
|---|---|---|---|---|---|---|---|
| | K | L | M | N | P | Q | R |
| RE$_2$O$_3$ (wt. %) | 1.8 | 1.8 | 1.8 | 9.7 | 8.1 | 2.0 | 1.6 |
| Na$_2$O (wt. %) | 0.20 | 0.18 | 0.33 | 0.45 | 0.35 | 0.49 | 0.47 |
| Surface Area (m$^2$/g) | 201 | 198 | 106 | 131 | 124 | 205 | 136 |
| App. density (ml/g) | — | — | — | 0.70 | 0.72 | 0.76 | 0.76 |
| Davison Attrition Index | — | — | — | — | 13 | — | 11 |
| Texture | | | | | | | |
| 30–60 Å (%) | — | — | 39 | 47 | 71 | — | 57 |
| 61–90 Å (%) | — | — | 9 | 17 | 9 | — | 20 |
| 91–180 Å (%) | — | — | 25 | 18 | 9 | — | 15 |
| 181–900 Å (%) | — | — | 26 | 17 | 9 | — | 6 |
| >900 Å (%) | — | — | 1 | 2 | 1 | — | 1 |

TABLE IV

| | PERFORMANCE | | | | | | |
|---|---|---|---|---|---|---|---|
| | K | L | M | N | P | Q | R |
| Conversion (%) | 74.8 | 75.1 | 61.9 | 63.9 | 67.4 | 70.8 | 59.3 |
| Selectivities: | | | | | | | |
| Hydrogen (%) | 0.04 | 0.04 | 0.04 | 0.02 | 0.02 | 0.04 | 0.08 |
| LPG (%) | 20.8 | 19.4 | 16.6 | 19.0 | 18.2 | 18.9 | 16.5 |
| Gasoline (%) | 73.3 | 72.2 | 76.0 | 74.5 | 74.2 | 74.1 | 74.3 |
| Coke (%) | 3.8 | 3.2 | 1.7 | 2.1 | 2.3 | 2.9 | 2.3 |
| LCO/HCO | 4.1 | 3.3 | 2.1 | 2.1 | 2.4 | 3.67 | 2.8 |

All catalysts according to the invention show an enhanced result in gasoline yield and bottom conversion in comparison with catalysts CA and CB. Also a decrease of hydrogen and coke production is found.

COMPARATIVE EXAMPLE I

For Comparative Example I a standard catalytic composition was prepared by adding RENH$_4$Y zeolite and kaolin to a sol of silica-alumina in the following amounts:
20% of RENH$_4$Y zeolite
58% of kaolin
22% of a synthetic matrix containing 97% of SiO$_2$ and 3% of Al$_2$O$_3$ The composition was fed to a colloidal mill and dried in a spray dryer.

The test results for the catalyst obtained are listed under comparative catalyst A (CA) in Table V below.

COMPARATIVE EXAMPLE II

A catalyst was prepared as described in Comparative Example I, but now alumina powder was added also. The amounts were as follows:
15% of RENH$_4$Y
43% of kaolin
20% of alumina powder
22% of a synthetic matrix containing 97% of SiO$_2$ and 3% of Al$_2$O$_3$ The composition was fed to a colloidal mill and dried in a spray dryer.

The test results for the catalyst obtained are listed under comparative catalyst B (CB) in the table below.

TABLE V

| Ingredients | CA | CB |
|---|---|---|
| RE$_2$O$_3$ (wt. %) | 1.8 | 2.0 |
| Na$_2$O (wt. %) | 0.36 | 0.19 |
| Surface Area (m$^2$/g) | 103 | 189 |
| App. density (ml/g) | 0.82 | 0.78 |
| Conversion (%) | 70.6 | 75.6 |
| Selectivities: | | |
| Hydrogen (%) | 0.02 | 0.05 |
| LPG (%) | 16.2 | 21.1 |
| Gasoline (%) | 69.9 | 68.4 |
| Coke (%) | 2.6 | 4.3 |
| LCO/HCO | 2.1 | 3.4 |

I claim:

1. A catalyst composition for fluid cracking comprising;
   a. 5 to 50% by weight of a crystalline aluminosilicate;
   b. 5 to 80% by weight of an acid treated clay selected from the group consisting of kaolin and metakaolin obtained by admixing said clay with an acid selected from the group consisting of phosphoric and acetic acid, with the resulting slurry being heated to 25°–110° for 1 to 100 hours under atmospheric or superatmospheric pressure so as to effect precipitation of alumina salts, filtering and washing the clay, and optionally, drying the clay;
   c. a matrix which may include 0 to 65% by weight of a clay and
   0 to 50% of compounds selected from the group consisting of silica, alumina, magnesia, zirconia, titania, and boria, 2. The catalyst composition of claim 1 wherein the clay of component (c) is kaolin.

3. The catalyst composition of claim 1 wherein the matrix of composition (c) is selected from the group consisting of silica, silica-alumina, or alumina.

4. The catalyst composition of claim 1, wherein the acid treated clay is obtained by admixing the clay with an acid solution, the ratio by weight of a 6wt. % or more acid solution to kaolin being from about 3:1 to about 6:1, the resulting suspension being heated at a temperature of from about 80° to about 105° C., the final pH being between from about 0.1 to about 4, then filtering, and washing the clay, and drying it at about 105° to about 115° C. for about 15 to about 18 hours.

5. The catalyst composition of claim 1, wherein component (b) is kaolin treated with a phosphoric acid solution.

6. The catalyst composition of claim 5, wherein phosphoric acid treated kaolin is subsequently treated with a rare earth solution, the resulting slurry being heated from about 25° to about 110° C. for about 60 to about 80 hours under atmospheric or superatmospheric pressure, washed and, optionally, dried.

7. The catalyst composition of claim 1, wherein component (b) is metakaolin treated with an acetic acid solution.

8. The catalyst composition of claim 1, comprising 15 to 30% of a crystalline aluminiosilicate selected from the group consisting of X and Y type and the ultrastabilized X and Y type zeolites, 10 to 50% of acid treated clay comprising component (b), 10 to 45% of kaolin, 0 to 20% of an active matrix, the balance being made up of a synthetic matrix selected from the group consisting of silica, silica-alumina, and alumina.

9. A method of preparation of the catalyst composition of claim 1, wherein the ingredients a–c of the catalytic composition are added to a hydrosol suspension of silica or silica-alumina, followed by forming and drying of the particles, and then washing, drying, and, optionally, calcining the raw catalyst.

10. A method of preparation of a catalyst composition according to claim 1, wherein aluminum chlorohydrol is added to the other catalyst components to adjust the pH of the suspension to between about 2 and about 6.5, and then spray drying the suspension.

* * * * *